(12) United States Patent
Miyata et al.

(10) Patent No.: US 11,519,416 B2
(45) Date of Patent: Dec. 6, 2022

(54) COMPRESSOR SYSTEM

(71) Applicant: MITSUBISHI HEAVY INDUSTRIES COMPRESSOR CORPORATION, Tokyo (JP)

(72) Inventors: Hiroyuki Miyata, Hiroshima (JP); Hideki Nagao, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/651,296

(22) Filed: Feb. 16, 2022

(65) Prior Publication Data

US 2022/0307512 A1  Sep. 29, 2022

(30) Foreign Application Priority Data

Mar. 26, 2021 (JP) .............................. JP2021-053814

(51) Int. Cl.
*F04D 13/02* (2006.01)
*F04D 29/043* (2006.01)
(Continued)

(52) U.S. Cl.
CPC ........... *F04D 13/028* (2013.01); *F01D 25/16* (2013.01); *F04D 29/043* (2013.01);
(Continued)

(58) Field of Classification Search
CPC ...... F04D 13/028; F04D 25/028; F04D 13/12; F04D 13/021; F04D 13/14; F04D 25/16; F01D 13/00; F01D 13/003; F01D 15/12
See application file for complete search history.

(56) References Cited

U.S. PATENT DOCUMENTS 4,010,016 A * 3/1977 Haugen ................. F04D 25/163
55/473
4,047,848 A * 9/1977 Poole .................... F04D 25/028
417/374

(Continued)

FOREIGN PATENT DOCUMENTS

WO  2016/042639 A1  3/2016

*Primary Examiner* — Eldon T Brockman
(74) *Attorney, Agent, or Firm* — Osha Bergman Watanabe & Burton LLP

(57) ABSTRACT

A compressor system includes a driving unit having a drive shaft, a plurality of compressors which compress a gas, and a transmission mechanism which increases a speed of a rotation of the drive shaft and transmits the rotation to the plurality of compressors. The transmission mechanism includes a main shaft which rotates together with the drive shaft and a plurality of gear mechanisms which transmit a rotation of the main shaft to the corresponding one compressor. The gear mechanism includes an auxiliary shaft which rotates together with an auxiliary gear meshing with the main gear, a plurality of first gears which rotate together with the auxiliary shaft, an output shaft to which an output gear meshing with the first gear is fixed and which is connected to the compressor, and a first bearing which rotatably supports the auxiliary shaft, and a second bearing which rotatably supports the output shaft.

5 Claims, 5 Drawing Sheets

(51) Int. Cl.
  *F01D 25/16*  (2006.01)
  *F04D 25/02*  (2006.01)
  *F04D 29/056* (2006.01)

(52) U.S. Cl.
  CPC .......... *F04D 25/028* (2013.01); *F04D 29/056* (2013.01); *F05D 2240/50* (2013.01); *F05D 2240/60* (2013.01); *F05D 2260/4031* (2013.01)

(56) References Cited

U.S. PATENT DOCUMENTS

| | | | | |
|---|---|---|---|---|
| 4,219,306 | A | * | 8/1980 | Fujino ................ F04D 17/12 |
| | | | | 415/62 |
| 5,154,571 | A | * | 10/1992 | Prumper ............. F04D 25/02 |
| | | | | 74/462 |
| 9,512,849 | B2 | * | 12/2016 | Naβ ................... F04D 25/163 |
| 10,100,837 | B2 | * | 10/2018 | Kempter ............. F04D 25/02 |
| 2013/0058761 | A1 | * | 3/2013 | Nass ................... F04D 25/163 |
| | | | | 415/122.1 |
| 2017/0218963 | A1 | | 8/2017 | Kobayashi et al. |

* cited by examiner

COMPRESSOR SYSTEM

BACKGROUND OF THE INVENTION

Field of the Invention

The present disclosure relates to a compressor system.

Priority is claimed on Japanese Patent Application No. 2021-053814, filed on Mar. 26, 2021, the content of which is incorporated herein by reference.

Description of Related Art

Some compressors, such as axial-flow compressors and centrifugal compressors, that generate various types of compressed fluids are driven by a driving machine (motor). For example, PCT International Publication No. WO 2016/042639 describes a compressor system in which a plurality of compressors are driven by one driving machine.

In the structure of PCT International Publication No. WO 2016/042639, a high-pressure side compressor and a low-pressure side compressor are connected in series to one driving machine via speed increasers connected to different output shafts.

SUMMARY OF THE INVENTION

Meanwhile, when the compressor connected to the output shaft of a two-axis driving machine, which is a drive shaft, is operated at high speed with respect to the driving machine as described above, the output shaft of the speed increaser that connects the speed increaser and the compressor rotates at high speed. Further, in order to rotate the output shaft at high speed, it is necessary to reduce a shaft diameter of the output shaft of the speed increaser. As the shaft diameter decreases, a diameter of a bearing that supports the output shaft of the speed increaser decreases. As the bearing decreases, a surface pressure, which is a load per unit area received by the bearing, increases due to an allowable peripheral speed of the bearing. When the surface pressure increases too much, an allowable surface pressure of the bearing is limited, and thus, it is difficult to stably support the shaft that rotates at high speed. As described above, it is difficult to stably operate a plurality of compressors at high speed with one driving machine.

The present disclosure provides a compressor system capable of stably operating a plurality of compressors at high speed with a driving machine.

According to an aspect of the present disclosure, there is provided a compressor system including: a driving unit configured to rotationally drive and including a drive shaft which configured to rotate about an axis; a plurality of compressors configured to compress a gas; and a transmission mechanism configured to increase a speed of a rotation of the drive shaft and transmit the rotation of the drive shaft to the plurality of compressors, in which the transmission mechanism includes a main shaft which configured to rotate together with the drive shaft, a main gear fixed to the main shaft, and a plurality of gear mechanisms disposed to surround the main shaft, wherein each of the plurality of gear mechanisms is configured to transmit a rotation of the main shaft to a corresponding one compressor, and each of the plurality of the gear mechanisms includes an auxiliary gear meshing with the main gear, an auxiliary shaft to which the auxiliary gear is fixed and which configured to rotate together with the auxiliary gear, a plurality of first gears disposed apart from each other in a circumferential direction to surround the auxiliary shaft and rotating together with the auxiliary shaft, an output gear meshing with the first gear, an output shaft to which the output gear is fixed and which is connected to each of the plurality of compressors, a first bearing rotatably supporting the auxiliary shaft, and a second bearing rotatably supporting the output shaft.

According to the compressor system of the present disclosure, it is possible to stably operate a plurality of compressors at high speed by one driving machine.

DETAILED DESCRIPTION OF THE INVENTION

Hereinafter, embodiments in which a compressor system according to the present disclosure is implemented will be described with reference to the accompanying drawings. However, the present disclosure is not limited to the embodiments.

(Configuration of Compressor System)

Figure 1:
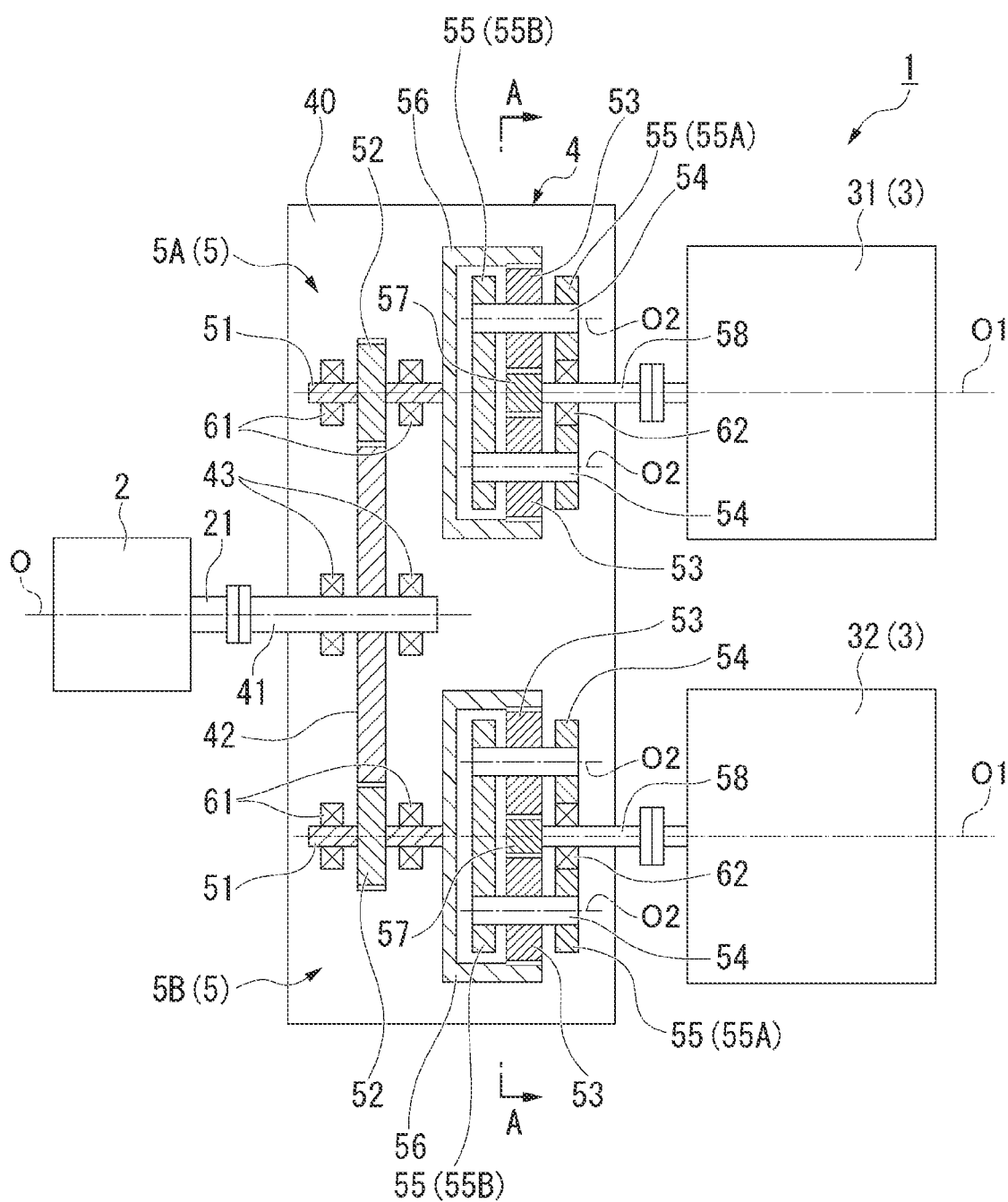
FIG. 1 is a schematic view showing a schematic configuration of a compressor system according to a first embodiment of the present disclosure.

In a compressor system 1, one driving machine 2 operates a plurality of compressors 3 at high speed. In the compressor system 1, the plurality of compressors 3 are arranged on the same side with respect to the driving machine 2, and the plurality of compressors 3 are connected in parallel to one driving machine 2. As shown in FIG. 1, the compressor system 1 of the present embodiment includes the driving machine 2, the plurality of compressors 3, and a transmission mechanism 4. In the compressor system 1 of the present embodiment, only one driving machine 2 is disposed.

The driving machine 2 is rotationally driven so as to generate power for driving the compressor 3. The driving machine 2 has a drive shaft 21 that rotates about an axis O. Only one drive shaft 21 is disposed. The drive shaft 21 is formed in a columnar shape centered on the axis O. The driving machine 2 of the present embodiment is a motor that drives the drive shaft 21. As the driving machine 2, a steam turbine or the like can be adopted in addition to the motor as long as the power for driving the compressor 3 can be generated.

The compressor 3 compresses a gas as a working fluid. The compressor 3 uses impellers (not shown) disposed inside the compressor to compress a gas having a molecular weight of 10 or less. The compressor 3 of the present embodiment is a uniaxial multi-stage centrifugal compressor that compresses hydrogen gas. As the compressor 3 of the present embodiment, there are three compressors, that is, a first compressor 31, a second compressor 32, and a third compressor (not shown). The first compressor 31, the second compressor 32, and the third compressor are connected in order via a pipe (not shown). In the compressor system 1, the gas to be compressed is introduced in the order of the first compressor 31, the second compressor 32, and the third compressor, and is sequentially compressed. The gas is compressed in the third compressor and then supplied to an external supply destination of the compressor system 1. The plurality of compressors 3 are not limited to being disposed to be connected in order so as to be coupled to each other. The plurality of compressors 3 may be disposed in parallel so that the compressors can be separated from each other and operated independently.

(Configuration of Transmission Mechanism)

The transmission mechanism 4 increases a speed of the rotation of the drive shaft 21 and transmits the rotation to the plurality of compressors 3. The transmission mechanism 4 connects one drive shaft 21 and the plurality of compressors 3. During a rated operation of the compressor 3, the transmission mechanism 4 rotates a sun shaft 58 described below so that a speed of the sun shaft increases to a peripheral speed of about 10,000 rotations or more and 100,000 rotations or less. The transmission mechanism 4 includes a casing 40, a main shaft 41, a main gear 42, a main shaft bearing 43, and a plurality of planetary gear mechanisms (gear mechanisms) 5.

The casing 40 constitutes the exterior of the transmission mechanism 4. The casing 40 internally houses the main shaft 41, the main gear 42, the main shaft bearing 43, and a plurality of planetary gear mechanisms 5.

The main shaft 41 rotates together with the drive shaft 21. The main shaft 41 transmits the rotation of the drive shaft 21 to the plurality of planetary gear mechanisms 5 via the main gear 42. The main shaft 41 is connected to an end portion of the drive shaft 21 outside the casing 40. The main shaft 41 is rotationally driven around the axis O by the drive shaft 21. The main shaft 41 is formed in a columnar shape centered on the axis O. That is, the main shaft 41 is disposed so as to be coaxial with the drive shaft 21. The main shaft 41 passes through the casing 40 so that a tip of the main shaft is disposed in the casing 40.

The main gear 42 is fixed to the main shaft 41 in the casing 40. The main gear 42 is an external gear formed in a disk shape centered on the axis O. The main gear 42 of the present embodiment has the largest outer diameter among the gears used in the transmission mechanism 4. The main gear 42 is not limited to having the largest outer diameter among the gears used in the transmission mechanism 4.

The main shaft bearing 43 rotatably supports the main shaft 41 with respect to the casing 40. The main shaft bearing 43 is fixed inside the casing 40. The main shaft bearing 43 of the present embodiment is a journal bearing. A pair of main shaft bearings 43 is disposed with respect to the main shaft 41 so that the main gear 42 is interposed therebetween.

(Configuration of Planetary Gear Mechanism)

Figure 2:
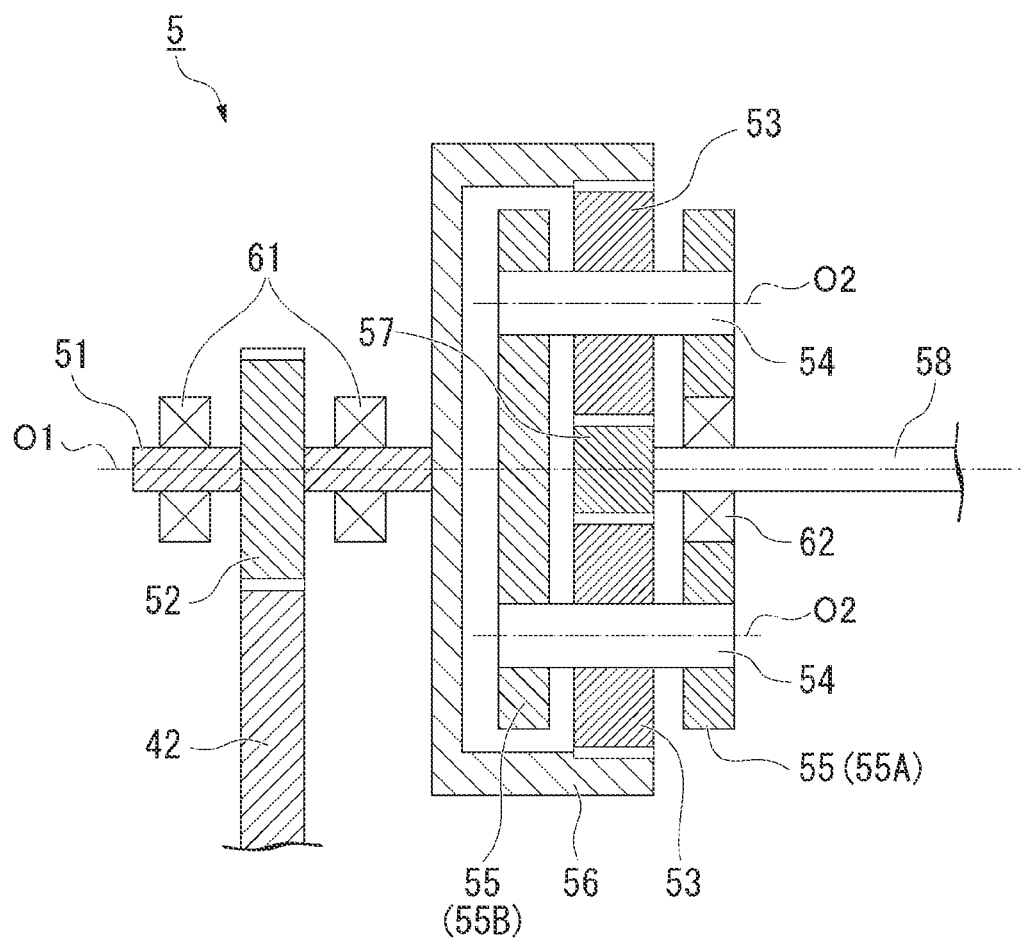
FIG. 2 is an enlarged view of a main portion of a compressor system showing a planetary gear mechanism of the first embodiment.
Figure 3:
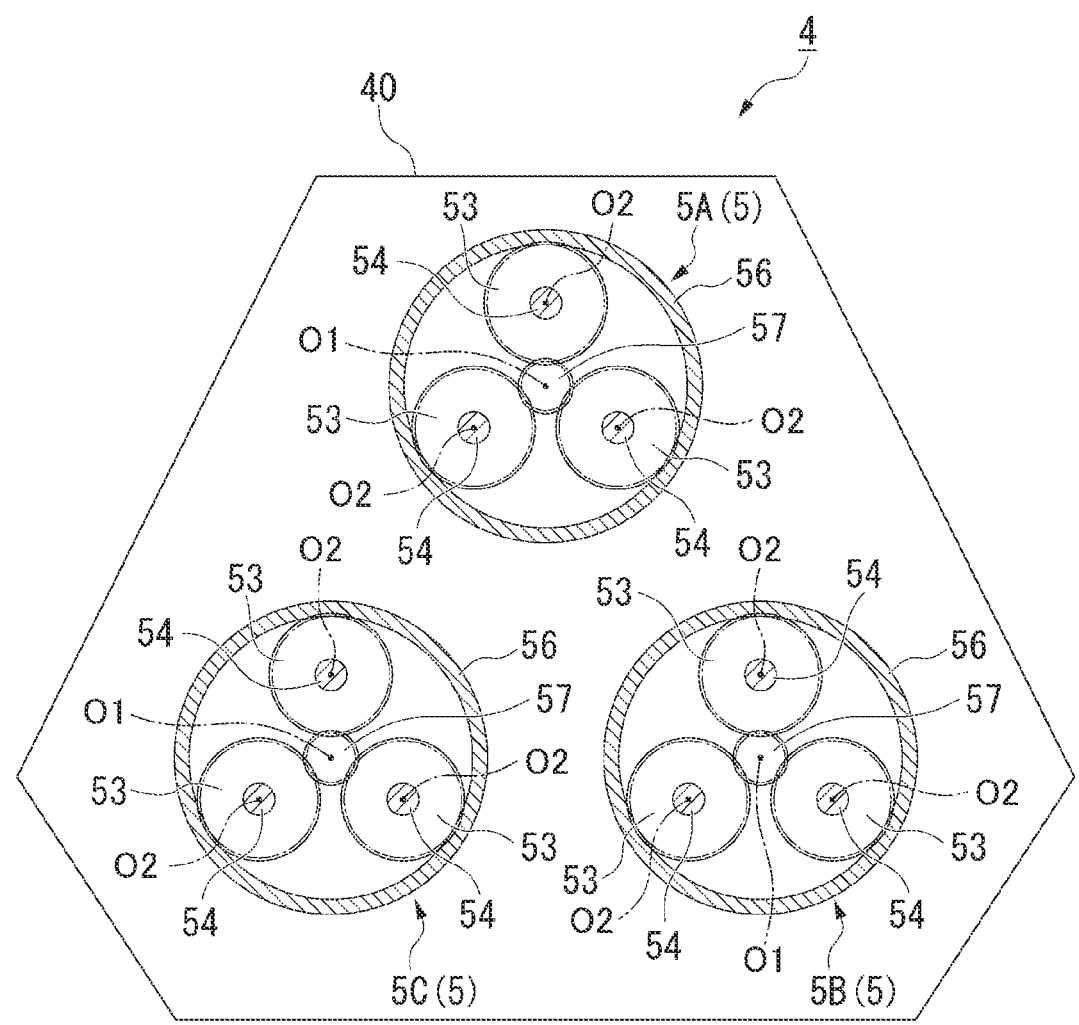
FIG. 3 is a cross-sectional view taken along line A-A of FIG. 1.

The plurality of planetary gear mechanisms 5 are gear mechanisms disposed inside the casing 40 so as to surround the main shaft 41. Each planetary gear mechanism 5 is connected to one corresponding compressor 3 in a one-to-one relationship. Each planetary gear mechanism 5 transmits the rotation of the main shaft 41 to one corresponding compressor 3. In the present embodiment, as shown in FIG. 3, three planetary gear mechanisms, that is, a first planetary gear mechanism 5A connected to the first compressor 31, a second planetary gear mechanism 5B connected to the second compressor 32, and a third planetary gear mechanism 5C connected to the third compressor are disposed to be evenly spaced apart in the casing 40. In the present embodiment, the first planetary gear mechanism 5A, the second planetary gear mechanism 5B, and the third planetary gear mechanism 5C have the same configuration. As shown in FIG. 2, each planetary gear mechanism 5 in the present embodiment includes an auxiliary shaft 51, an auxiliary gear 52, a plurality of planetary gears (first gears) 53, a plurality of first gear shafts 54, a gear support portion 55, an internal gear 56, a sun gear (output gear) 57, a sun shaft (output shaft) 58, a first bearing 61, and a second bearing 62.

The rotation of the main shaft 41 is transmitted to the auxiliary shaft 51, and the auxiliary shaft 51 rotates together with the main shaft 41. The auxiliary shaft 51 is formed in a columnar shape centered on a first center line O1 extending parallel to the axis O. The auxiliary shaft 51 is disposed at a position distant from the main shaft 41 to the outside in a radial direction of the main shaft 41. The auxiliary shaft 51 extends parallel to the main shaft 41. The auxiliary shaft 51 rotates about the first center line O1 by rotating the main shaft 41.

The auxiliary gear 52 meshes with the main gear 42. The auxiliary gear 52 is fixed to the auxiliary shaft 51. The auxiliary gear 52 is an external gear formed in a disk shape centered on the first center line O1. The auxiliary gear 52 of the present embodiment has an outer diameter smaller than that of the main gear 42. The auxiliary gear 52 is not limited to having the outer diameter smaller than that of the main gear 42. For example, the auxiliary gear 52 may have the same diameter as that of the main gear 42.

The plurality of planetary gears 53 are the first gears in the gear mechanism in which the rotation of the auxiliary shaft 51 is transmitted and which rotates together with the auxiliary shaft 51. The rotation of the auxiliary shaft 51 is transmitted to the plurality of planetary gears 53 via the internal gear 56, and the plurality of planetary gears 53 rotate with the rotation of the auxiliary shaft 51. The plurality of planetary gears 53 are disposed outside the auxiliary shaft 51 in the radial direction with respect to the auxiliary shaft 51. As shown in FIG. 3, the plurality of planetary gears 53 are disposed at intervals in a circumferential direction of the sun shaft 58. In the present embodiment, the three planetary gears 53 are evenly spaced apart in the circumferential direction. The number of planetary gears 53, which are the first gears, is not limited to three, but may be two or more, and four or more may be disposed. At that time, it is preferable that three or more planetary gears 53 are evenly spaced apart from each other. Each planetary gear 53 is an external gear formed in a disk shape centered on the second center line O2. The plurality of planetary gears 53 do not revolve, but only rotate around the second center line O2, which is their own center line.

As shown in FIG. 2, the first gear shaft 54 is a planetary gear shaft that rotates together with the planetary gear 53. The first gear shaft 54 is formed in a columnar shape centered on the second center line O2 extending in parallel with the axis O and the first center line O1. The first gear shaft 54 is disposed at a position distant from the auxiliary shaft 51 to the outside in the radial direction of the auxiliary shaft 51. The first gear shaft 54 extends in parallel with the main shaft 41 and the auxiliary shaft 51. The first gear shaft 54 supports the planetary gear 53 so as to be rotatable around the second center line O2.

The gear support portion 55 rotatably supports the plurality of planetary gears 53. The gear support portion 55 of the present embodiment has a first gear support portion 55A and a second gear support portion 55B. Specifically, the first gear support portion 55A and the second gear support portion 55B are planetary carriers that rotatably support both ends of the plurality of first gear shafts 54 about the second center line O2. The first gear support portion 55A and the second gear support portion 55B maintain the mutual positions of the plurality of first gear shafts 54 so that the plurality of first gear shafts 54 do not move. The first gear support portion 55A is fixed to the casing 40 in a non-movable state. The second gear support portion 55B is not fixed to the casing 40.

The internal gear 56 is fixed to an end portion of the auxiliary shaft 51. The internal gear 56 has a plurality of teeth arranged inward in an annular shape centered on the first center line O1 and meshes with the plurality of planetary gears 53. The internal gear 56 of the present embodiment is formed in a bottomed cylindrical shape centered on the first center line O1. As shown in FIG. 3, the internal gear 56 meshes with the plurality of planetary gears 53 accommodated therein from the outside. The internal gear 56 rotates together with the auxiliary shaft 51 to transmit the rotation of the auxiliary shaft 51 to a plurality of planetary gears 53 disposed inside. In the internal gear 56, a member which has teeth formed inside and is formed in a tubular shape and a member fixed to the auxiliary shaft 51 may be formed of different members. Therefore, the internal gear 56 may have a structure in which a plurality of holes are formed in the member fixed to the auxiliary shaft 51. Further, the internal gear 56 may have a straddle shape in which the member fixed to the auxiliary shaft 51 is divided into a plurality of members.

The sun gear 57 is an output gear that meshes internally with the plurality of planetary gears 53. The sun gear 57 is an external gear formed in a disk shape centered on the first center line O1. An outer diameter of the sun gear 57 is smaller than those of the plurality of planetary gears 53. The sun gear 57 is not limited to a disk shape, and may be a cylindrical shape. That is, a thickness of the sun gear 57 is not limited at all. Further, the sun gear 57 is not limited to having the outer diameter smaller than those of the plurality of planetary gears 53. Therefore, a size of the sun gear 57 may be the same as or larger than those of the plurality of planetary gears 53.

As shown in FIG. 2, the sun shaft 58 is an output shaft in which the sun gear 57 is fixed to one end portion of the sun shaft (an end portion close to the driving machine 2). The sun shaft 58 is connected to a rotation shaft of the compressor 3 at the other end portion of the sun shaft (an end portion opposite to the end portion near the driving machine 2). The sun shaft 58 rotates about the first center line O1 together with the sun gear 57 to which the rotation of the planetary gear 53 is transmitted. The sun shaft 58 is formed in a columnar shape centered on the first center line O1. The axis of the sun shaft 58 coincides with the first center line O1 of the auxiliary shaft 51. That is, the sun shaft 58 is disposed so as to be parallel to the drive shaft 21 and displaced outward in the radial direction. As shown in FIG. 1, the sun shaft 58 passes through the casing 40 so that a tip (one end portion) of the sun shaft is disposed in the casing 40. The sun shaft 58 is not limited to the structure that passes through the casing 40 so that the tip of the sun shaft is disposed in the casing 40. When a joint is used, the sun shaft 58 may not have a structure passing through the casing 40 as long as the sun shaft is accommodated in the casing 40.

As shown in FIGS. 1 and 2, the first bearing 61 rotatably supports the auxiliary shaft 51 with respect to the casing 40. The first bearing 61 is fixed inside the casing 40. The first bearing 61 of the present embodiment is a journal bearing. The first bearing 61 may be a bearing having the same type and size as the main shaft bearing 43, or may be a bearing having a type and size different from those of the main shaft bearing, as long as the first bearing is a journal bearing. Therefore, the first bearing 61 may be a rolling bearing or a slide bearing. When the first bearing 61 is a slide bearing, for example, the first bearing may be a sleeve type bearing that is not divided in the circumferential direction and formed in a tubular shape. When the first bearing 61 is a slide bearing, for example, the first bearing may be a tilting pad bearing having a plurality of pads divided in the circumferential direction. A pair of first bearings 61 is disposed with respect to the auxiliary shaft 51 so that the auxiliary gear 52 is interposed.

The second bearing 62 rotatably supports the sun shaft 58 with respect to the casing 40. The second bearing 62 is fixed to the first gear support portion 55A. The second bearing 62 of the present embodiment is a tilting pad bearing. The second bearing 62 is disposed at a position close to the compressor 3 with respect to the sun gear 57. The second bearing 62 is not limited to the structure fixed to the first gear support portion 55A as long as the second bearing may be in a non-movable state with respect to the casing 40. For example, the second bearing 62 may be directly fixed to the casing 40. Further, the second bearing 62 may be a bearing to which a damping function for damping the vibration of the sun shaft 58 is added.

(Action Effect)

In the compressor system 1 having the above configuration, the speed of the rotation of the drive shaft 21 increases and the rotation is transmitted to the compressor 3 via the transmission mechanism 4. In the transmission mechanism 4, the rotation of the drive shaft 21 causes the main shaft 41 connected to the drive shaft 21 to rotate. As a result, the main gear 42 fixed to the main shaft 41 rotates. The rotation of the main gear 42 causes the auxiliary gear 52 that meshes with the main gear 42 to rotate, and the auxiliary shaft 51 rotates in a state where the rotation speed is higher than that of the main shaft 41. As the auxiliary shaft 51 rotates, the internal gear 56 connected to the auxiliary shaft 51 rotates. As the internal gear 56 rotates, the three planetary gears 53 rotate, and the sun gear 57 that meshes with the three planetary gears 53 rotates. As a result, the sun shaft 58 to which the sun gear 57 is fixed rotates in a state where the rotation speed is higher than that of the auxiliary shaft 51. In this way, the rotation of the drive shaft 21 is transmitted in the order of the main shaft 41, the main gear 42, the auxiliary gear 52, the auxiliary shaft 51, the internal gear 56, the three planetary gears 53, the sun gear 57, and the sun shaft 58. As the sun shaft 58 rotates, the rotation is transmitted to the compressor 3 connected to the sun shaft 58.

In the compressor system 1 of the present embodiment, the planetary gear mechanism 5 which is the gear mechanism is interposed while the rotation is being transmitted from the driving machine 2 to the compressor 3. That is, the auxiliary shaft 51 is not directly connected to the compressor 3, but is connected to the compressor 3 via the planetary gear mechanism 5. Therefore, even when the compressor 3 is operated at high speed, since the sun shaft 58 is rotated at high speed, it is not necessary to rotate the auxiliary shaft 51 at high speed. That is, the auxiliary shaft 51 can be rotated at a speed lower than that of the sun shaft 58. As a result, it is not necessary to reduce a shaft diameter of the auxiliary shaft 51. Therefore, it is not necessary to reduce the size of the first bearing 61 that supports the auxiliary shaft 51, and the surface pressure received by the first bearing 61 can be reduced. As a result, various bearings can be used as the first bearing 61 regardless of the type of journal bearing. Therefore, the auxiliary shaft 51 can be stably supported while ensuring a degree of freedom in design with respect to the first bearing 61. Further, in the planetary gear mechanism 5, a load transmitted from the three planetary gears 53 disposed evenly apart to the sun gear 57 disposed in the center is offset by the loads acting from each of the three planetary gears 53 and becomes extremely small. As a result, the load of the planetary gear 53 hardly acts on the sun shaft 58 to which the sun gear 57 is fixed. Therefore, even when the sun shaft 58 is rotated at high speed, a surface pressure acting on the second bearing 62 from the sun shaft 58 can be suppressed. In this way, the surface pressure acting on the bearings disposed in the transmission mechanism 4 can be reduced. Therefore, even when the compressor 3 is operated at high speed, the influence on the second bearing 62 is reduced, and the size of the second bearing 62 can be reduced. By having the plurality of planetary gear mechanisms 5, the influence on the bearing can be reduced, and the plurality of compressors 3 can be stably operated at high speed by one driving machine 2.

Further, the sun shaft 58 is supported by the second bearing 62, which is a tilting pad bearing. That is, the sun shaft 58 is supported by a tilting pad bearing that can support the shaft even when the surface pressure is very small. As a result, even when the surface pressure acting on the second bearing 62 from the sun shaft 58 is suppressed by the plurality of planetary gears 53, the sun shaft 58, which is likely to cause unstable vibration due to high-speed rotation, can be stably supported by the second bearing 62.

Further, the compressor 3 compresses hydrogen gas having a molecular weight of 10 or less. In a case where a gas having a small molecular weight such as hydrogen gas is compressed, it is often impossible to compress the gas to a desired pressure unless the gas is gradually compressed in multiple steps by a large number of impellers. That is, when compressing a gas having a small molecular weight, even when a multi-stage compressor is used, one compressor is not sufficient, and thus, it is necessary to use the plurality of compressors 3. Meanwhile, when the driving machine 2 or a speed increaser is installed in each compressor 3 in order to drive the plurality of compressors 3, an installation cost increases. Further, when the plurality of compressors 3 are connected in series to one driving machine 2 via the speed increaser and the plurality of compressors 3 are operated at high speed, a large load is applied to the sun shaft 58 which is the output shaft of the speed increaser. As a result, it becomes necessary to secure the strength of the bearing supporting the sun shaft 58 and the sun shaft 58 itself, which increases the installation cost. Meanwhile, in the present application, the speed of the rotation of one driving machine 2 increases and the rotation is transmitted to the plurality of compressors 3 via the transmission mechanism 4 having the plurality of planetary gear mechanisms 5, and thus, the plurality of compressors 3 which operate at high speed can be connected to one driving machine 2 in parallel. As a result, the load on each sun shaft 58 of the plurality of transmission mechanisms 4 which are speed increasers is suppressed. Further, by suppressing the load on the sun shaft 58, the sun shaft 58 itself can be made thinner in terms of strength, and a structure suitable for higher speed rotation can be obtained.

Further, the plurality of planetary gears 53 mesh with the internal gears 56 fixed to the auxiliary shaft 51. As a result, the rotation of the auxiliary shaft 51 can be transmitted to the planetary gear 53 with a simple configuration.

Second Embodiment

Next, a second embodiment of the compressor system according to the present disclosure will be described. In the second embodiment described below, the same reference numerals are given in the drawings to the configurations common to the first embodiment, and descriptions thereof will be omitted.

(Configuration of Planetary Gear Mechanism)

Figure 4:
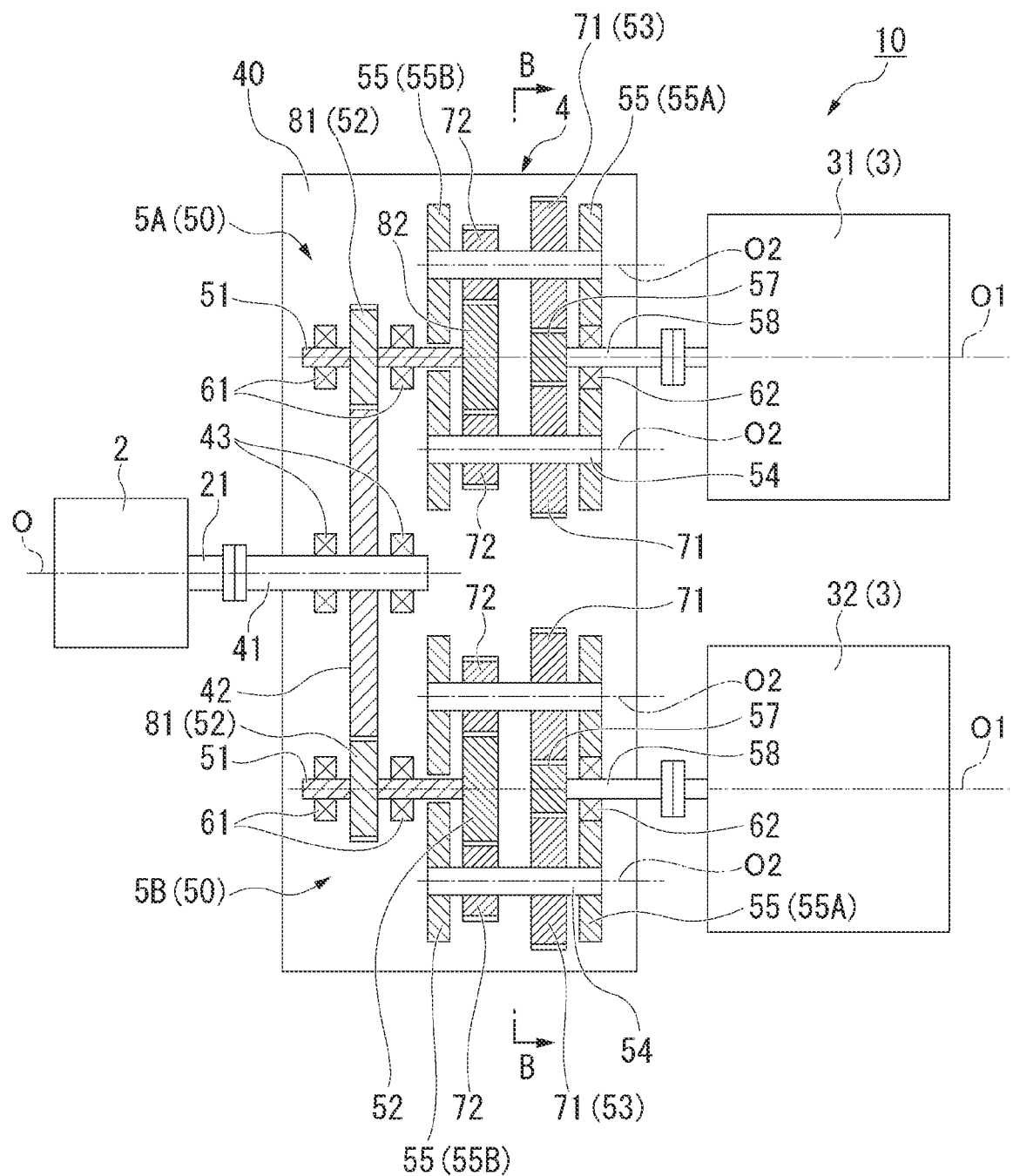
FIG. 4 is a schematic view showing a schematic configuration of a compressor system according to a second embodiment of the present disclosure.
Figure 5:
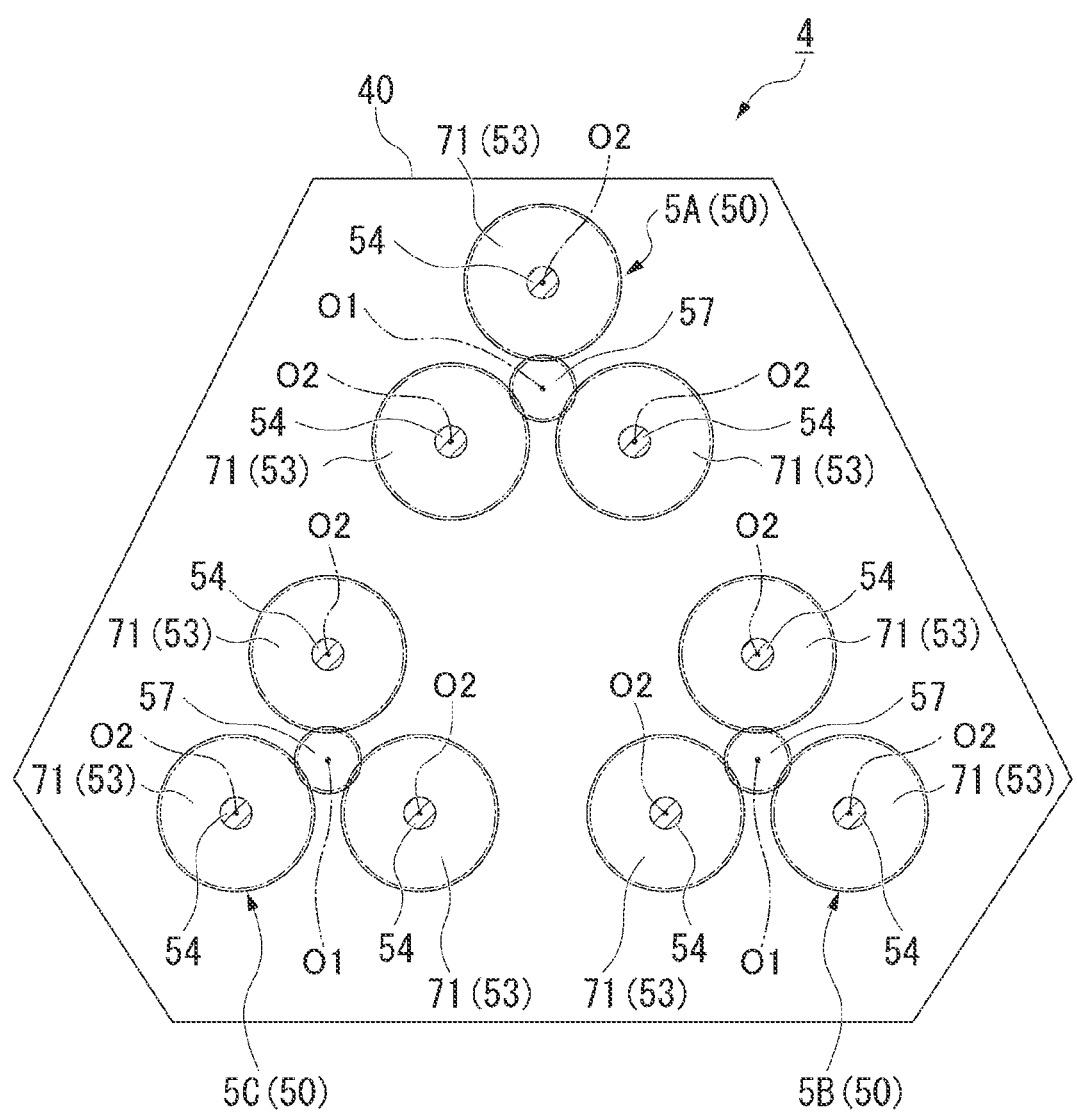
FIG. 5 is a cross-sectional view taken along line B-B of FIG. 4.

As shown in FIGS. 4 and 5, in a compressor system 10 of the second embodiment, the structure of the gear mechanism is different from that of the first embodiment. The gear mechanism 50 of the second embodiment does not have the internal gear 56. The gear mechanism 50 has a second gear 72 and a second auxiliary gear 82.

The second gear 72 is a gear different from the first gear 71 when the planetary gear 53 is referred to as the first gear 71. The second gear 72 is fixed to the first gear shaft 54 at a position distant from the first gear 71. The second gear 72 is disposed at a position closer to the driving machine 2 than the first gear 71. The second gear 72 is an external gear formed in a disk shape centered on the second center line O2. An outer diameter of the second gear 72 is smaller than that of the first gear 71. The second gear 72 is not limited to having the outer diameter smaller than that of the first gear 71. For example, the second gear 72 may have a larger outer diameter than the first gear 71, or may be the same. A plurality of second gears 72 are disposed so that one second gear is disposed corresponding to one first gear 71. The plurality of second gears 72 rotate around the second center line O2.

The second auxiliary gear 82 is a gear different from the first auxiliary gear 81 when the auxiliary gear 52 is referred to as the first auxiliary gear 81. The second auxiliary gear 82 is fixed to an end portion of the auxiliary shaft 51 at a position distant from the first auxiliary gear 81. The second auxiliary gear 82 is disposed at a position closer to the compressor 3 than the first auxiliary gear 81. The second auxiliary gear 82 meshes with the second gear 72. The second auxiliary gear 82 is an external gear formed in a disk shape centered on the first center line O1. The second auxiliary gear 82 has the same outer diameter as that of the first auxiliary gear 81. The second auxiliary gear 82 is not limited to having the same outer diameter as that of the first auxiliary gear 81. For example, the second auxiliary gear 82 may have a larger or smaller outer diameter than the first auxiliary gear 81. One second auxiliary gear 82 is disposed so as to correspond to one first auxiliary gear 81.

(Action Effect)

The internal gear 56, which is the gear that meshes with the planetary gear 53 from the outside in the radial direction, is disposed so as to surround the planetary gear 53 from the outside in the radial direction. Therefore, the internal gear 56 receives a force that spreads outward in the radial direction when the internal gear is affected by a large centrifugal force as in the case of rotating at high speed. When the internal gear 56 is deformed by receiving the force that spreads outward in the radial direction, it is difficult to stably transmit the rotation to the planetary gear 53. Meanwhile, in the compressor system 10 of the second embodiment, the internal gear 56 that meshes with the planetary gear 53 does not exist unlike in the first embodiment. Specifically, in the gear mechanism 50 of the second embodiment, the rotation of the auxiliary shaft 51 is transmitted to the second gear 72 via the second auxiliary gear 82. Then, when the second gear 72 rotates, the first gear shaft 54 rotates and the first gear 71 rotates.

In this way, the rotation of the auxiliary shaft 51 is transmitted to the sun shaft 58 without interposing the gear that meshes with the first gear 71 and the second gear 72 from the outside in the radial direction. As a result, even when each gear rotates at high speed, it is less likely to be affected by the centrifugal force. Therefore, the gear mechanism 50 can be made to correspond to higher speed. Therefore, the plurality of compressors 3 can be operated at a higher speed more stably by one driving machine 2.

Other Embodiments

As described above, the embodiment of the present disclosure is described in detail with reference to the drawings. However, the specific configurations are not limited to the embodiments, and include a design modification or the like within a scope which does not depart from the gist of the present disclosure.

In the present embodiment, the speed of the sun shaft 58 increases to a peripheral speed of 10,000 rotations or more to operate the plurality of compressors 3 at high speed. However, as long as the compressors are rotated at high speed, rotation speeds of the plurality of compressors 3 may be different from each other. That is, each of the first compressor 31, the second compressor 32, and the third compressor may be operated at different rotation speeds.

Further, the number of each of the planetary gear mechanisms 5 and gear mechanisms 50 disposed in the transmission mechanism 4 is not limited to three as in the present embodiment. Two or more planetary gear mechanisms 5 and two or more gear mechanisms 50 may be disposed in one transmission mechanism 4. Further, the plurality of planetary gear mechanisms 5 and the gear mechanism 50 are not limited to having the same configuration. For example, the plurality of gear mechanisms may be configured with different gear ratios. Further, in the plurality of gear mechanisms, some gear mechanisms may have the internal gears 56 as in the first embodiment, and some gear mechanisms may have the first gear 71 or the second gear 72 as in the second embodiment.

<Additional Note>

A compressor system 1 described in the embodiments is ascertained as follows, for example.

(1) A compressor system 1 according to the first aspect configured to rotationally drive and includes a driving unit including a drive shaft 21 which configured to rotate about an axis O, a plurality of compressors 3 configured to compress a gas, and a transmission mechanism 4 configured to increase a speed of a rotation of the drive shaft 21 and transmit the rotation of the drive shaft 21 to the plurality of compressors 3, in which the transmission mechanism 4 includes a main shaft 41 which configured to rotate together with the drive shaft 21, a main gear 42 fixed to the main shaft 41, and a plurality of gear mechanisms disposed to surround the main shaft 41, wherein each of the plurality of gear mechanisms is configured to transmit a rotation of the main shaft 41 to the corresponding one compressor 3, and each of the plurality of the gear mechanisms an auxiliary gear 52 meshing with the main gear 42, an auxiliary shaft 51 to which the auxiliary gear 52 is fixed and which configured to rotate together with the auxiliary gear 52, a plurality of first gears disposed apart from each other in a circumferential direction to surround the auxiliary shaft 51 and rotating together with the auxiliary shaft 51, an output gear meshing with the first gear, an output shaft to which the output gear is fixed and which is connected to each of the plurality of compressors 3, a first bearing 61 rotatably supporting the auxiliary shaft 51, and a second bearing 62 rotatably supporting the output shaft.

In the compressor system 1, the gear mechanism is interposed while the rotation is transmitted from the driving machine 2 to the compressor 3. That is, the auxiliary shaft 51 is not directly connected to the compressor 3, but is connected to the compressor 3 via the gear mechanism. Therefore, even when the compressor 3 is operated at high speed, since the output shaft is rotated at high speed, it is not necessary to rotate the auxiliary shaft 51 at high speed. That is, the auxiliary shaft 51 can be rotated at a speed lower than that of the output shaft. As a result, it is not necessary to reduce a shaft diameter of the auxiliary shaft 51. As a result, the auxiliary shaft 51 can be stably supported regardless of the type of bearing. Therefore, the auxiliary shaft 51 can be stably supported while ensuring a degree of freedom in design with respect to the first bearing 61. Further, in the gear mechanism, loads transmitted from the plurality of first gears to the output gear 57 disposed at the center are offset by the loads acting from each of the plurality of first gears and become extremely small. As a result, the load of the first gear hardly acts on the output shaft to which the output gear is fixed. As a result, even when the output shaft is rotated at high speed, a surface pressure acting on the second bearing 62 from the output shaft can be suppressed. In this way, since the surface pressure acting on the bearing disposed in the transmission mechanism 4 can be reduced, the influence on the second bearing 62 is reduced even when the compressor 3 is rotated at high speed. By having the plurality of planetary gear mechanisms 5, the influence on the bearing can be reduced, and the plurality of compressors 3 can be stably operated at high speed by one driving machine 2.

(2) In the compressor system 1 according to a second aspect, in the compressor system 1 of (1), the second bearing 62 may be a tilting pad bearing.

Therefore, the output shaft is supported by a tilting pad bearing that can support the shaft even when the surface pressure is very small. As a result, even when the surface pressure acting on the second bearing 62 from the output shaft is suppressed by the plurality of first gears, the output shaft, which is likely to cause unstable vibration due to high-speed rotation, can be stably supported by the second bearing 62.

(3) In the compressor system 1 according to a third aspect, in the compressor system 1 of (1) or (2), the plurality of compressors 3 may compress the gas having a molecular weight of 10 or less.

When compressing a gas having a small molecular weight, one compressor 3 may not be sufficient. In this case, it is necessary to use the plurality of compressors 3, which increases the installation cost. Meanwhile, the rotation of one driving machine 2 is accelerated and transmitted to the plurality of compressors 3 via the transmission mechanism 4 having the plurality of gear mechanisms, and thus, the plurality of compressors 3 which operate at high speed can be connected to one driving machine 2 in parallel. As a result, the load on each output shaft of the plurality of transmission mechanisms 4 which are speed increasers disposed in parallel is suppressed. Further, by suppressing the load on the output shaft, the output shaft itself can be made thinner, and a structure suitable for higher speed rotation can be obtained.

(4) In the compressor system 1 according to a fourth aspect, in the compressor system 1 of any one of (1) to (3), each of the plurality of the gear mechanisms may be a planetary gear mechanism having a planetary gear as the first gear, and the planetary gear mechanism 5 may have an internal gear 56 fixed to the auxiliary shaft 51, formed in an annular shape centered on an axis of the output shaft, and meshing with a plurality of the planetary gears 53.

As a result, the rotation of the auxiliary shaft 51 can be transmitted to the planetary gear 53 with a simple configuration.

(5) In the compressor system 10 according to a fifth aspect, in the compressor system 1 of any one of (1) to (4), each of the plurality of the gear mechanisms 50 may include a first gear shaft 54 to which the first gear 71 is fixed and which is rotatable around a center line of the first gear 71, a second gear 72 fixed to the first gear shaft 54 at a position distant from the first gear 71, and a second auxiliary gear 82 fixed to the auxiliary shaft 51 at a position distant from the auxiliary gear 52 and meshing with the second gear 72.

Therefore, the rotation of the auxiliary shaft 51 can be transmitted to the output shaft without interposing the gear that meshes with the first gear 71 and the second gear 72 from the outside in the radial direction. As a result, even when each gear rotates at high speed, it is less likely to be affected by the centrifugal force. Therefore, the gear mechanism 50 can be made to correspond to higher speed. As a result, the plurality of compressors 3 can be operated at a higher speed more stably by one driving machine 2.

EXPLANATION OF REFERENCES 1, 10: compressor system
O: axis
2: driving machine
21: drive shaft
3: compressor
31: first compressor
32: second compressor
4: transmission mechanism
40: casing
41: main shaft
42: main gear
43: main shaft bearing
5: planetary gear mechanism (gear mechanism)
50: gear mechanism
51: auxiliary shaft
52: auxiliary gear
O1: first center line
53: planetary gear (first gear)
O2: second center line
54: planetary gear shaft (first gear shaft)
55: gear support portion
55A: first gear support portion
55B: second gear support portion
56: internal gear
57: sun gear (output gear)
58: sun shaft (output shaft)
61: first bearing
62: second bearing
5A: first planetary gear mechanism
5B: second planetary gear mechanism
5C: third planetary gear mechanism
71: first gear
72: second gear
81: first auxiliary gear
82: second auxiliary gear

What is claimed is:

1. A compressor system comprising:
a driving unit configured to rotationally drive and including a drive shaft which configured to rotate about an axis;
a plurality of compressors configured to compress a gas; and
a transmission mechanism configured to increase a speed of a rotation of the drive shaft and transmit the rotation of the drive shaft to the plurality of compressors,
wherein the transmission mechanism includes
a main shaft which configured to rotate together with the drive shaft,
a main gear fixed to the main shaft, and
a plurality of gear mechanisms disposed to surround the main shaft, wherein each of the plurality of gear mechanisms is configured to transmit a rotation of the main shaft to a corresponding one compressor, and
each of the plurality of the gear mechanisms includes
an auxiliary gear meshing with the main gear,
an auxiliary shaft to which the auxiliary gear is fixed and which configured to rotate together with the auxiliary gear,
a plurality of first gears disposed apart from each other in a circumferential direction to surround the auxiliary shaft and configured to rotate together with the auxiliary shaft,
an output gear meshing with the first gear,
an output shaft to which the output gear is fixed and which is connected to each of the plurality of compressors,
a first bearing rotatably supporting the auxiliary shaft, and
a second bearing rotatably supporting the output shaft.

2. The compressor system according to claim 1, wherein the second bearing is a tilting pad bearing.

3. The compressor system according to claim 1, wherein the plurality of compressors compress the gas having a molecular weight of 10 or less.

4. The compressor system according to claim 1, wherein each of the plurality of the gear mechanisms is a planetary gear mechanism having a planetary gear as the first gear, and
the planetary gear mechanism has an internal gear fixed to the auxiliary shaft, formed in an annular shape centered on an axis of the output shaft, and meshing with a plurality of the planetary gears.

5. The compressor system according to claim 1, wherein each of the plurality of the gear mechanisms includes
a first gear shaft to which the first gear is fixed and which is rotatable around a center line of the first gear,
a second gear fixed to the first gear shaft at a position distant from the first gear, and
a second auxiliary gear fixed to the auxiliary shaft at a position distant from the auxiliary gear and meshing with the second gear.

* * * * *